United States Patent [19]
Shultz

[11] 4,066,245
[45] Jan. 3, 1978

[54] CONTROL FOR HOPPER LOADER FOR GRANULAR MATERIALS

[75] Inventor: Gilbert F. Shultz, Novi, Mich.

[73] Assignee: Whitlock, Inc., Farmington, Mich.

[21] Appl. No.: 681,851

[22] Filed: Apr. 30, 1976

[51] Int. Cl.² ................................................ B01F 5/00
[52] U.S. Cl. .................................... 366/139; 366/152; 366/179
[58] Field of Search .................. 259/4 R, 18, 154, 149

[56] References Cited

U.S. PATENT DOCUMENTS

| | | | |
|---|---|---|---|
| 3,608,869 | 9/1971 | Woodle | 259/154 X |
| 3,780,991 | 12/1973 | Evans et al. | 259/18 |
| 3,822,056 | 7/1974 | Hawes, Jr. et al. | 259/154 X |

Primary Examiner—Billy S. Taylor
Attorney, Agent, or Firm—Kinzer, Plyer, Dorn & McEachran

[57] ABSTRACT

A versatile control for a plural-material vacuum hopper loader comprising a blowback timer which generates a blowback enabling signal for a time interval T2, a blowback signal generator which develops a series of blowback pulse signals of adjustable duration, and blowback logic which actuates an air supply to apply pulses of air to the hopper loader during interval T2. A fill timer generates a fill enabling signal over a time interval T3, and a fill signal generator develops a repeating sequence of fill actuating signal pulses of adjustable relative duration; the fill enabling signal energizes an evacuation apparatus to evacuate the hopper continuously during interval T3 whereas fill logic actuates fill control valves (one for each material) in the repeating sequence of the fill actuating signal pulses throughout the same interval. Each timer effectively resets the other; for a hopper loader using a local blower as the evacuating apparatus, an additional coastdown (idle) timer is used to afford an idle time T1 between intervals T3 and T2.

11 Claims, 7 Drawing Figures

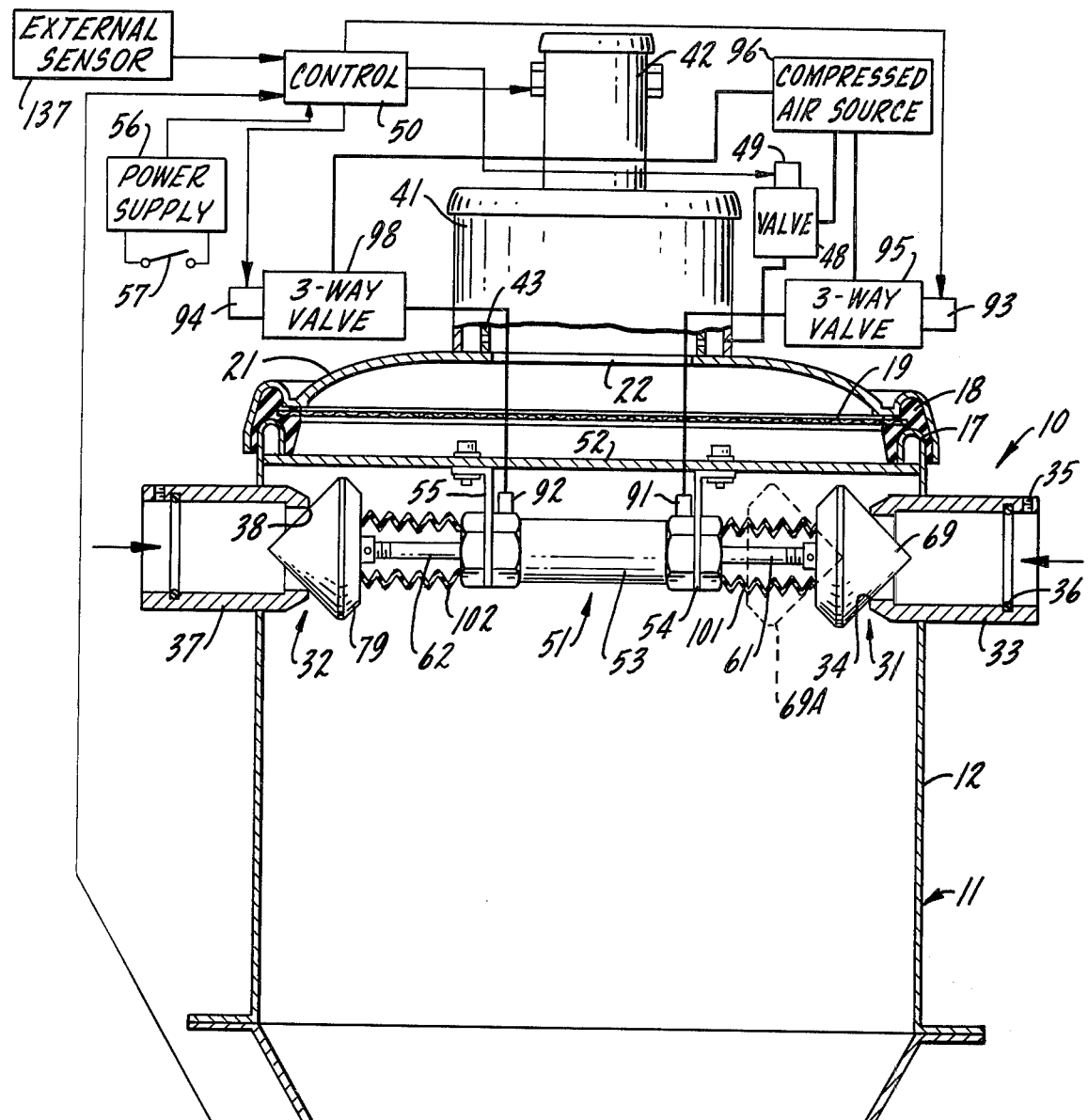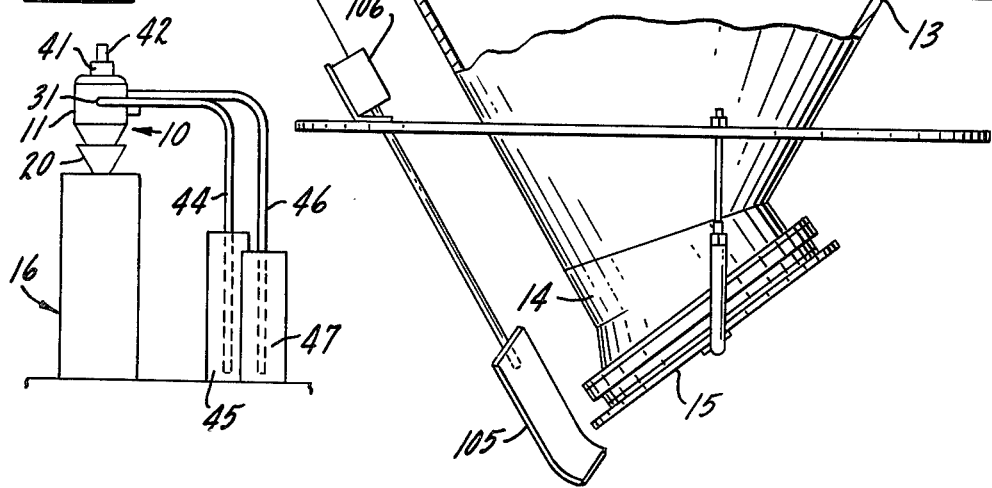

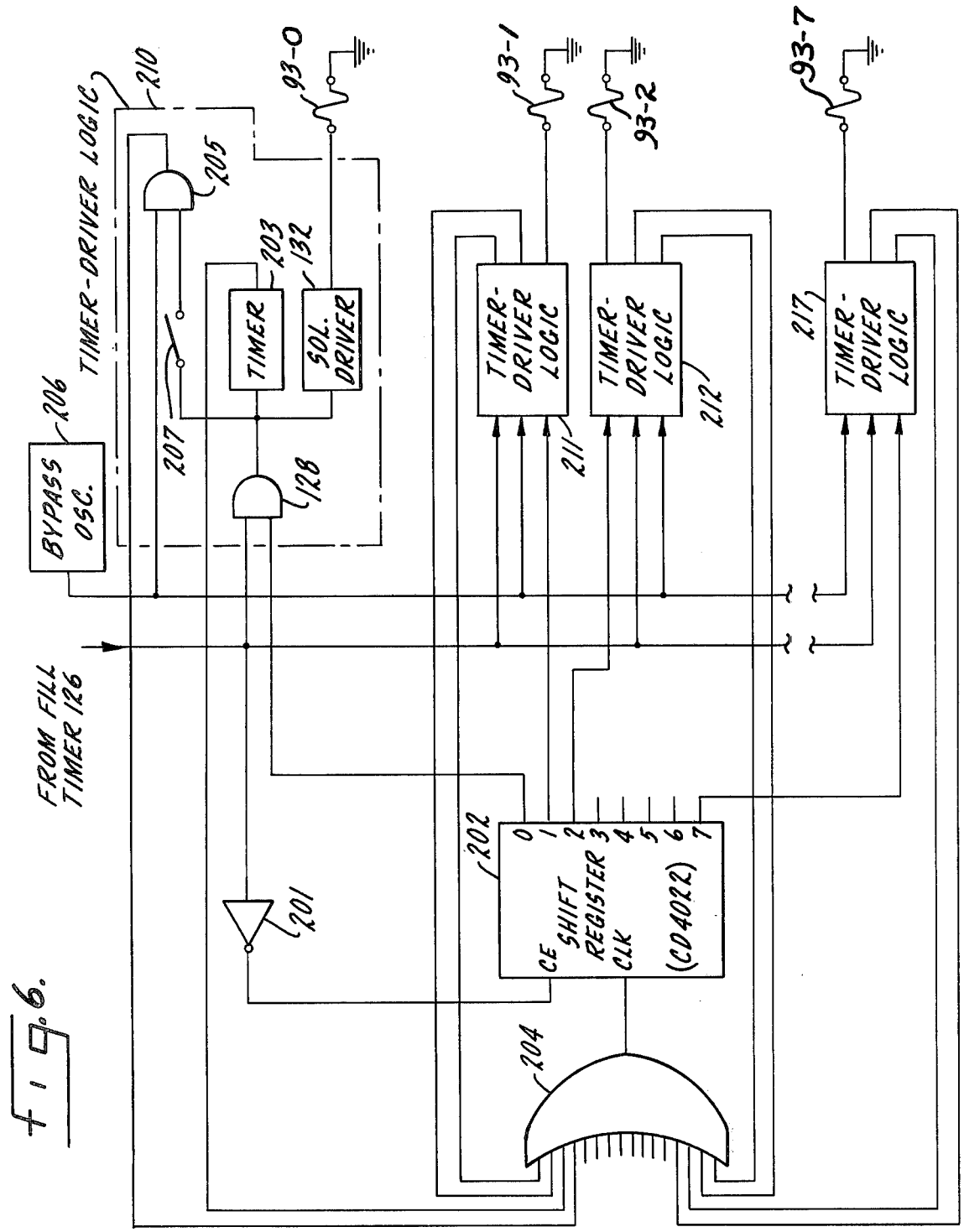

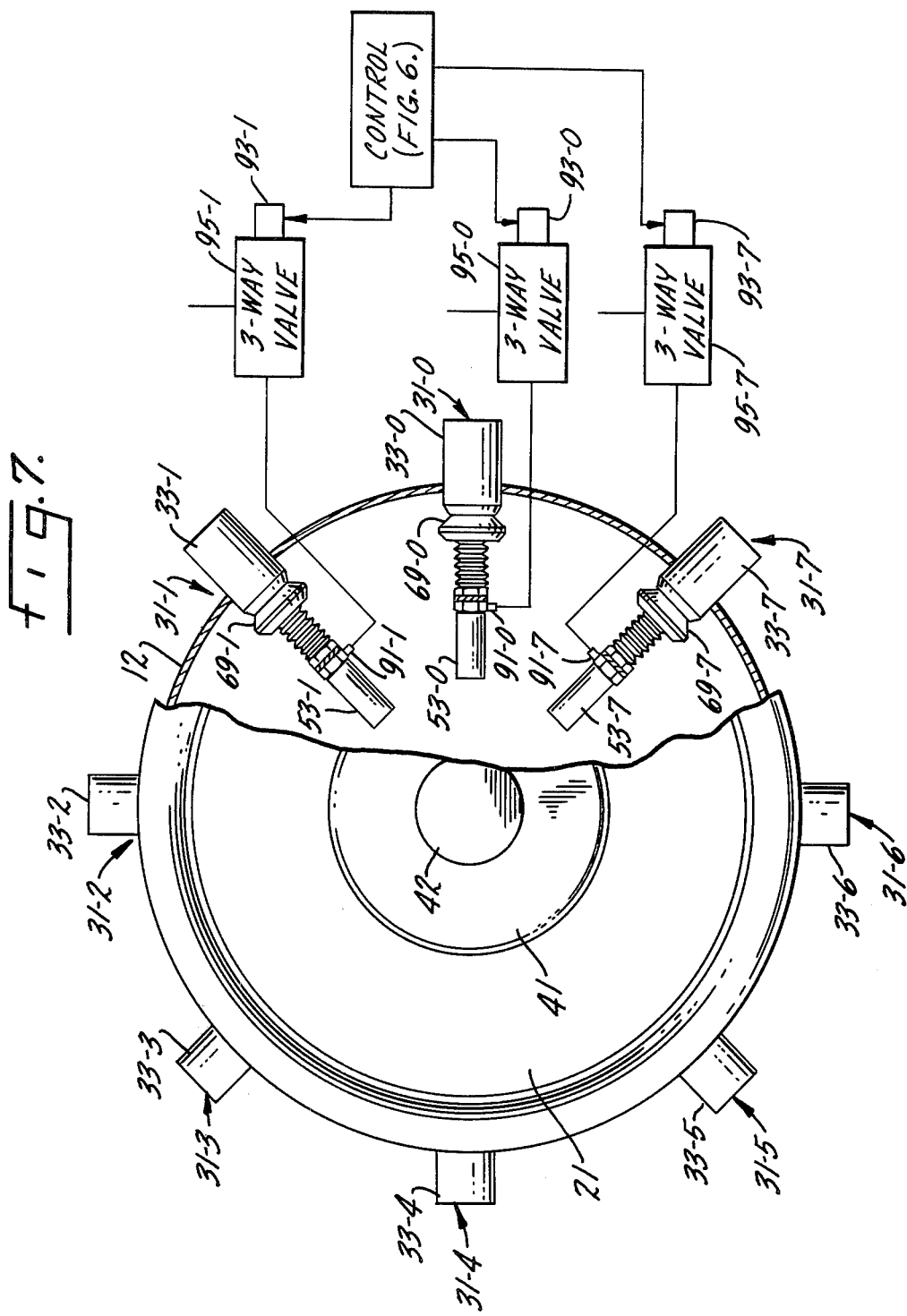

CONTROL FOR HOPPER LOADER FOR GRANULAR MATERIALS

BACKGROUND OF THE INVENTION

A vacuum hopper loader, such as the proportioning hopper described and claimed in Evans et al U.S. Pat. No. 3,780,991, affords an efficient and economical apparatus for loading processing machines with granulated plastic and other similar free flowing materials. Commercial proportioning hopper loaders of this kind can readily provide for loading at high rates (e.g., 1,600 lbs/hour over short distances). Two or more materials can be effectively mixed together, by the hopper loader, in the course of the loading process.

Control of a hopper loader of this kind, however, often presents difficult problems. With previously known controls, a change of the desired proportions for the materials being mixed is often time-consuming, leading to undesirable down time for the hopper loader and the process equipment, such as a plastic molding press, fed by the hopper loader. Precise proportioning of the inlet materials and effective mixing present substantial problems, if conventional mechanical, electromechanical, or even electronic controls are utilized, often producing undesirable effects in the composition of the process apparatus output.

Furthermore, the previously known controls for hopper loaders of this type have not been readily adaptable to the requirements of auger grinders and other material sources that may require removal of a particular material, by the hopper loader, at a rate sufficient to avoid backup or other malfunction at the material source. Another problem with hopper loader controls results from variations in the hopper loader itself; construction of a control that is equally adaptable to a hopper loader using a local blower as a vacuum source and to one using a central blower for both vacuum and filter blowback presents substantial technical problems.

SUMMARY OF THE INVENTION

It is a principal object of the invention, therefore, to provide a new and improved electronic control circuit for a vacuum hopper loader that effectively and economically overcomes the problems and difficulties of previously known controls, particularly those set forth above.

Another object of the invention is to provide a new and improved electronic control circuit for a vacuum hopper loader which permits ready and convenient variation of the frequency, duration, and total application time of filtercleaning blowback air pulses applied to the hopper loader.

A further object of the invention is to provide a new and improved control circuit for a vacuum hopper loader that allows for ready, highly precise, and convenient adjustment of the relative proportions of the materials fed into and mixed in the hopper, actuating the hopper to supply the different materials in a repetitive sequence of short bursts that are adjustable in relative duration over a broad range, during substantial fill interval that is also adjustable in duration.

Another object of the invention is to provide a new and improved control circuit for a vacuum fill hopper that is instantaneously responsive to requirements of an external material source such as an auger grinder.

A further object of the invention is to provide a new and improved control circuit of standardized construction that can be applied to a variety of vacuum hopper loaders of differing construction.

Accordingly, the invention relates to a control circuit for a vacuum hopper loader of the kind comprising a hopper having an air port at the top of the hopper, a filter extending across the air port, a plurality of material inlet ports located below the filter, individual electrically actuated material fill control valves for opening and closing the material inlet ports, and air supply means for supplying air under pressure to the air port and evacuation means connected to the air port. The control circuit comprises blowback timer means for developing a blowback enabling signal for a predetermined time interval T2, blowback signal generator means for developing a blowback actuating signal comprising a series of pulses, and including means for adjusting the period of such pulses, and blowback logic means, connected to the blowback timer means and blowback signal generator means and to the air supply means, for actuating the air supply means to apply a series of pulses of air through the filter into the hopper during the time interval T2. The control circuit further comprises fill timer means for developing a fill enabling signal for a predetermined time interval T3, fill signal generator means for developing a repeating sequence of fill actuating signal pulses, one pulse for each fill control valve, including means for adjusting the relative durations of the fill actuating signal pulses, fill vacuum coupling means for actuating the evacuation means to evacuate the hopper continuously during time interval T3, and fill logic means connected to the fill timer means, the fill signal generator means, and the fill control valves to open the control valves in repeating sequence during time interval T3. The control circuit also includes control sequence coupling means interconnecting the output of a first one of the timer means with an input of the second timer means to set the second timer means in response to timing out of the first timing means.

BRIEF DESCRIPTION OF THE DRAWINGS

FIG. 1 is an elevation view, partly in cross section and partly schematic, of a vacuum hopper loader to which the control circuit of the present invention is applied;

FIG. 2 illustrates the connections of the vacuum hopper loader to material supply sources and to a processing apparatus;

FIG. 6 is a block diagram, partly schematic, of a modification of the control circuit of FIG. 3; and FIG. 7 is a simplified partially sectional plan view, partly schematic, of a vacuum hopp loader which may be actuated by the control c FIG. 6.

DESCRIPTION OF THE PREFERRED EMBODIMENT

Figure 3:
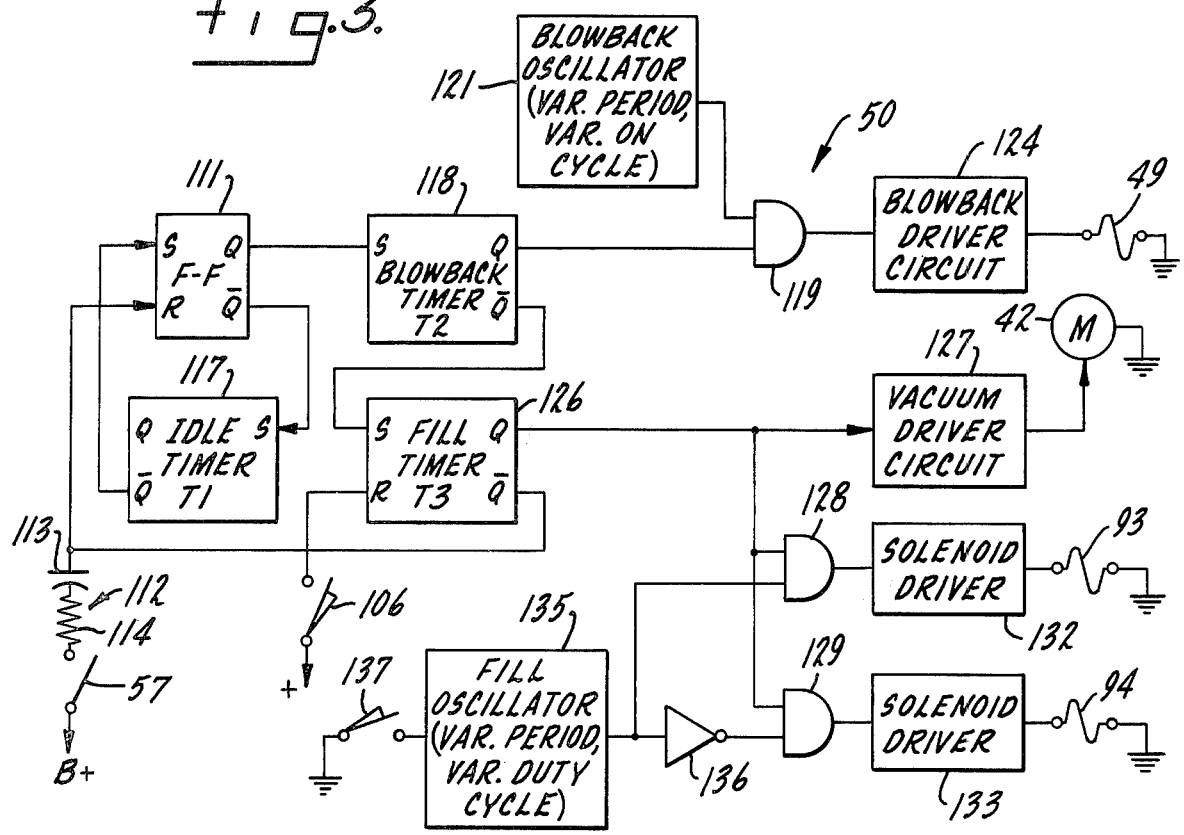
FIG. 3 is a block diagram of a control circuit for a vacuum hopper loader according to one embodiment of the present invention.

FIGS. 1 and 2 illustrate a preferred form of hopper loader 10 with which the control of the invention is employed. As shown in FIG. 1, device 10 comprises a hopper 11 having a cylindrical upper section 12 and a conical lower section 13 which terminates in an outlet 14, provided with a closure member 15, through which granular material is fed to the receiving hopper 20 of a molding press or other processing equipment 16 (FIG. 2). The upper rim of hopper 11 affords a gasket seat 17 on which a gasket 18 is mounted. A filter 19 extends across the entire upper portion of hopper 11. A cover 21 fits closely over gasket 18 and seals the upper portion of hopper 11. Conventional clamp mechanisms, not shown, afford a pressure mounting for cover 21. A vacuum and pressure opening 22 is centered in cover 21.

There are two material inlet ports 31 and 32 in the upper portion of hopper 11. Port 31 comprises a connector 33 that extends through the upper wall of hopper section 12, terminating internally in a valve seat 34. The outer portion of connector 33 includes suitable means, such as a set screw 35 and an O-ring seal 36, to afford a substantially air-tight connection to a conveyor conduit. Any other suitable form of connector construction may be utilized as desired. The construction for inlet port 32 corresponds to that for port 31. Thus, port 32 comprises a conduit connector 37 affording an internal valve seat 38. The two material inlet ports 31 and 32 are coaxially aligned with each other.

The vacuum and pressure port 22 of device 10 is connected to a blower 41 driven by an electric motor 42. Blower 41 and motor 42 may be of conventional construction, corresponding to the blower-motor unit of a standard vacuum cleaner. At the base of blower 41 there is a multiple-apertured ring 43 encompassing opening 22. A compressed air supply 96 is connected to the annular space around ring 43 by a valve 48 controlled by a solenoid 49.

As shown in FIG. 2, inlet port 31 is connected to a conveyor conduit 44 that extends to a first material supply 45. The other inlet port 32 of device 10 (FIG. 1) is connected by a conveyor conduit 46 (FIG. 2) to a second material supply 47. Supplies 45 and 47 may both be storage bins; on the other hand, one supply (e.g., supply 47) may be an auger grinder or other source of particulate material.

Hopper loader 10, as shown in FIG. 1, further comprises a valve mechanism 51, located in the upper section 12 of hopper 11, for controlling the flow of materials into hopper 11 through ports 31 and 32. Valve mechanism 51 includes a cylinder 53 suspended from a support bar 52 by two brackets 54 and 55. A valve plunger 61 extends into one end of cylinder 53 and is connected to a piston (not shown) mounted within the cylinder. Plunger 61 carries a conical valve closure member 69; the main body of member 69 is preferably molded of moderately soft elastomer material. A similar plunger 62 is connected to a piston mounted in the end of cylinder 51 facing inlet port 32, and carries a valve closure member 79. When valves 31 and 32 are closed, as shown in FIG. 1, the conical closure member 69 engages valve seat 34 of inlet port 31 in a continuous line-contact seal. Similarly, the conical closure member 79 engages the valve seat 38 of inlet port 32 in a continuous line-contact seal. Biasing springs in cylinder 53 normally maintain ports 31 and 32 closed, as shown.

Cylinder 53 has two pressure inlet ports 91 and 92. Port 91 is connected to a three-way control valve 95 actuated by a solenoid 93. Valve 95 has an inlet connection to the compressed air supply 96. Source 96 is also connected to a valve 98, actuated by a solenoid 94, that is connected to the cylinder port 92. Plungers 61 and 62 may be provided with protective sleeves 101 and 102, respectively, to minimize penetration of powdered or granular material into valve mechanism 51.

In considering the operation of hopper loader 10, it may be assumed that the receiving hopper 20 of process equipment 16 contains an adequate quantity of granular or powdered material. As long as this condition is maintained, hopper 11 is held at about atmospheric pressure.

Loader 10 is preferably equipped with a sensor, comprising a sensing paddle 105 and sensing switch 106, for detecting the level of material in machine hopper 20. This sensing device may be completely conventional. As machine 16 continues to use material from hopper 20, switch 106 ultimately signals a sequence control 50 (FIG. 1) to indicate that the material supply in hopper 20 is no longer adequate. Control 50 is energized from a power supply 56 connected to a start switch 57. Control 50, which is electrically connected to motor 42 and solenoids 49, 93 and 94, then energizes solenoid 49 to open valve 48, sending air from supply 96 through the openings in ring 43 and down through filter 19 into loader 10, cleaning the filter. Subsequently, control 50 de-energizes solenoid 49 and energizes motor 42. Blower 41 then pumps air out of loader 10, through port 22, developing a substantial vacuum in hopper 11. Filter 19 prevents any substantial withdrawal of material from the hopper.

With hopper 11 evacuated, control 50 energizes solenoid 93 to actuate valve 95 and connect the fluid pressure source 96 to port 91 of cylinder 53. As a consequence, compressed air introduced into cylinder 53 drives valve plunger 61 to the left and withdraws valve closure member 69 to position 69A, free of engagement with the valve seat 34 of inlet port 31. The vacuum in the upper portion 12 of hopper 11 now causes granular material to be drawn from the first supply 45 (FIG. 2) into the upper portion of hopper 11.

After a relatively brief time interval, during which a predetermined quantity of granular material is drawn into hopper 11 from bin 45, control 50 de-energizes solenoid 93 and restores valve 95 to its initial condition, venting port 91 to the atmosphere. Plunger 61 moves back to the right, engaging valve closure member 69 with valve seat 34 and closing port 31. At the same time, control 50 energizes solenoid 94 to actuate valve 98 and connect the fluid pressure source 96 to the other inlet port 92 of cylinder 53. The actuation of valve 98 thus directs a flow of air under pressure through port 92 into cylinder 53, moving closure member 79 away from valve seat 38 and opening port 32. Inlet port 32 is held open for a limited period of time determined by control 50. During this short time interval, the vacuum in the upper portion of hopper 11 causes material to be drawn from supply 47 through conduit 46 and inlet port 32 into hopper loader 10.

After inlet port 32 has been held open for a short time interval, control 50 again actuates valves 95 and 98 to open port 31 and close port 32. This operation is repeated several times so that short "bursts" of two different materials are fed alternately into hopper 11 of loader 10. The alternate opening and closing of ports 31 and 32 is carried out in accordance with a predetermined timing cycle to introduce the two distinct materials into the hopper in predetermined proportions. The materials spray across the upper surface of hopper 11 in a widespread pattern; by maintaining each port open for only a relatively short interval, thorough mixing of the two materials is effected and "layering" is minimized.

After a predetermined fill time, control 50 interrupts the feeding of material to hopper 11 by de-energizing solenoids 93 and 94 so that valves 95 and 98 vent both of the cylinder ports 91 and 92 to the atmosphere. As a consequence, both valve plungers 61 and 62 return to their closed positions, illustrated in FIG. 1. This closes both of the material inlet ports 31 and 32 and terminates the conveying of material into the hopper loader. In some systems, it may be desirable to maintain a limited positive pressure within hopper 11 during subsequent operations in which material is fed from the hopper through gate 15 to process equipment 16. Whenever material is being withdrawn from loader 10 into machine hopper 20, valve plungers 61 and 62 remain in their normally closed positions, illustrated in FIG. 1, closing both material inlet ports 31 and 32.

As thus far described, hopper loader 10 corresponds essentially to the hopper loader described and claimed in Evans et al U.S. Pat. No. 3,780,991. It is the control 50 that constitutes the subject matter of the present invention.

FIG. 3 affords a simplified block diagram of control 50 as constructed in accordance with one embodiment of the present invention. Control 50 includes a flip-flop circuit 111 having its reset input connected to a suitable B+ supply through a pulsing input circuit 112 comprising a capacitor 113, a current limiting resistor 114, and the start switch 57. The $\bar{Q}$ output of flip-flop 111 is connected to the set input S of a countdown or idle timer circuit 117 having a $\bar{Q}$ output connected back to the set input S of flip-flop 111. Timer 117 is a timing device of the kind which, upon application of a suitable "set" input signal, maintains a "high" or logical "true" output on an output terminal, here designated as the Q output terminal, for a predetermined time interval. Upon expiration of that time interval, the Q output goes "low" or "not true", and the $\bar{Q}$ output of the timer then produces a high signal. This kind of timer has been illustrated in FIG. 3, for timers 117, 118 and 126, for purposes of convenience and simplicity; somewhat different timers that afford the same basic function are illustrated in the specific circuit of FIG. 4.

The Q output of flip-flop 111 is connected to the set input of a blowback timer 118. The Q output of blowback timer 118 is connected to one input of an AND gate 119. Gate 119 has a second input that is connected to the output of an oscillator 121. Preferably, oscillator 121 is constructed to afford convenient and accessible means for adjusting the oscillator frequency and particularly the period of output of given polarity for the oscillator. The output of gate 119 is connected to a blowback driver circuit 124. Driver circuit 124 is connected to solenoid 49 to actuate valve 48 (see FIG. 1) and supply air from supply 96, under pressure, into the upper portion of hopper loader 10.

The $\bar{Q}$ output of blowback timer 118 is connected to the set input of a fill timer circuit 126. The Q output of timer 126 is connected to a vacuum driver circuit 127 that is in turn connected to motor 42. Driver circuit 127 energizes motor 42 for rotation in a direction to evacuate the upper portion of hopper loader 10.

The Q output of timer 126 is also connected to one input for each of two AND gates 128 and 129. The output of gate 128 is connected to a solenoid driver circuit 132 that is in turn connected to the solenoid 93 for the valve 95 which opens inlet port 31 to supply material to hopper 11 from source 45. The output of gate 129, on the other hand, is connected to another solenoid driver circuit 133 utilized to energize the solenoid 94 which controls operation of the inlet port 32 for the material supplied to hopper 11 from source 47.

Control 50, in the form illustrated in FIG. 3, includes another oscillator 135. The circuit employed for oscillator 135 is preferably one which provides convenient and accessible means to adjust the oscillation period or frequency and also to adjust the duty cycle of the oscillator. The output of oscillator 135 is connected directly to one input of AND gate 128. The oscillator output is also applied to an input of AND gate 129 through an inverter 136. A sensing switch 137 is electrically connected to oscillator 135; closing of switch 137 disables oscillator 135 to the extent that a high or true signal is produced continuously by the oscillator whenever the switch is closed.

The $\bar{Q}$ output of fill timer 126 is connected back to the reset input of flip-flop 111.

To initiate operation of hopper loader 10, using control 50 as illustrated in FIG. 3, switch 57 is closed, supplying a reset signal to flip-flop 111. The flip-flop then applies a set signal to idle timer 117. When timer 117 times out at the end of a predetermined interval T1, a set signal is supplied from the timer to flip-flop 111, which in turn applies a set signal from its Q output to blowback timer 118. During the initial idle time T1, corresponding to curve 141 in FIG. 5, no blowback or material flow operation occurs in hopper loader 10.

When blowback timer 118 is first set, it supplies a logical true signal to AND gate 119 from its Q output. This is an enabling signal that actuates gate 119 to supply an actuating signal from oscillator 121 to blowback driver circuit 124. On alternate half cycles of the signal from oscillator 121, blowback driver circuit 124 energizes solenoid 49 to open valve 48, which directs air under pressure through ring 43 and opening 22 downwardly through filter 19, cleaning the filter (see FIG. 1). Depending upon the material employed for filter 19, the materials being handled by hopper loader 10, and other factors, it may be necessary or desirable to modify the duration of the pulses of air directed onto filter 19 in order to optimize cleaning action and air consumption. Thus, in a given instance the intervals in which valve 48 is opened during the blowback time T2 may be equal to the intervals in which the valve is closed, as indicated by curve 142 in FIG. 5. On the other hand, the intervals during which the air is on may be substantially longer than those in which the air is off, as indicated by curve 142A. The on intervals may also be made shorter than the off intervals.

Blowback timer 118 times out at the end of a predetermined time interval T2. At this point, the output at terminal Q of timer 118 goes low, ending the enabling signal to AND gate 119 and interrupting the blowback operation for solenoid 49 and valve 48. At the same time, a high signal is produced at output $\bar{Q}$ of timer 118 and is supplied as a set signal to fill timer 126. Assuming that the level sensor switch 106 is open, indicating that process equipment hopper 20 can accept additional material, fill timer 126 begins a fill interval with a high or logical true output at terminal Q and a low output at terminal $\bar{Q}$.

The high output from terminal Q of timer 126 is applied to vacuum driver circuit 127 to energize motor 42 continuously, driving blower 41 in a direction to evacuate hopper loader 10. The same signal from the Q terminal of timer 126 is supplied as an enabling signal to AND gates 128 and 129. Each of these gates receives a signal from oscillator 135, but the phase of the signal is reversed in inverter 136 so that AND gates 128 and 129 supply actuating signals to the solenoid driver circuit 132 and 133 on alternate half cycles of the signal from oscillator 135. This results in the opening and closing of ports 31 and 32 as indicated by curve 143 (FIG. 5) during a time interval T3 determined by fill timer 126.

Figure 5:
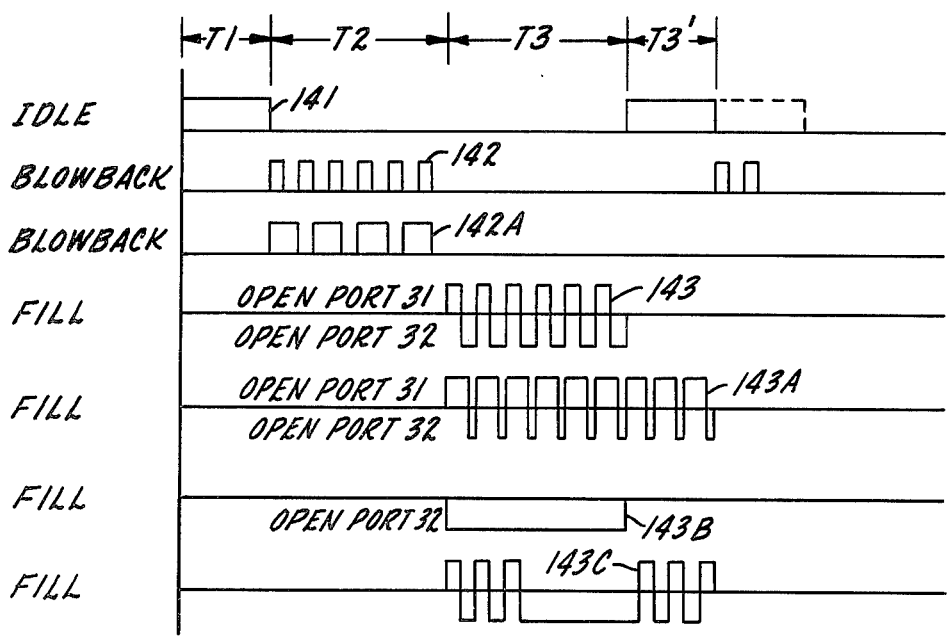
FIG. 5 is a timing chart illustrating operation of the control circuits of FIGS. 3 and 4.

As shown by curve 143, FIG. 5, the periods during which the two material inlet ports 31 and 32 are open may be equal, in which case equal quantities of the two materials are fed into hopper loader 10 from supplies 45 and 47. However, it may be and often is desirable to vary the proportions of the two materials so that they are not equal. For example, as illustrated by curve 143A in FIG. 5, it may be desirable to feed material from supplies 45 and 47 in a ratio of approximately 3:1. This is accomplished by adjusting the relative lengths of the alternate half cycles for the output signal for oscillator 135.

In some instances, one material source for hopper loader 10 (e.g., supply 47) may comprise an auger grinder or other device which does not have adequate storage capacity for material after it is ground or otherwise processed. Thus, in an auger grinder backups frequently occur in the outlet storage compartment, jamming the grinder. This condition is detected by a suitable sensor, shown as an external sensor 137 in FIG. 1 and represented by the sensing switch 137 in FIG. 3. For a system of this kind, closing of switch 137 effectively interrupts operation of oscillator 135, leaving the oscillator in a condition in which it produces a low output signal that does not enable gate 128, so that solenoid driver 132 is not actuated and solenoid 93 cannot be energized. For these conditions, no material is drawn into hopper loader 10 from supply 45. On the other hand, the low output from oscillator 135 is inverted to a high output by inverter 135 and affords a continuous actuating signal to gate 129. Accordingly, throughout the fill time T3, for these conditions, solenoid driver 133 is actuated to energize solenoid 94 so that all of the filling of hopper loader 10 is effected from the auger grinder, assumed to constitute supply 47. This condition is illustrated by curve 143B in FIG 5. Curve 143C shows the effect of a short-term actuation of sensor 137, during an extended time T3'.

At the end of a time interval T3 determined by the setting of fill timer 126, the output at the Q terminal of timer 126 goes low, interrupting the filling operation by effectively deenergizing each of the driver circuits 127, 132 and 133. At the same time, the $\overline{Q}$ output of timer 126 goes high, supplying a reset signal to flip-flop 111 and starting a new cycle of operation for control 50 and hopper loader 10.

In those instances in which sensing switch 106 is closed, indicating that machine hopper 20 is not ready for more material, fill timer 126 is reset immediately after it is set, so that the fill period T3 is effectively reduced to zero. No fill operation is effected for hopper loader 10 and a new cycle is initiated for control 50. The next fill operation occurs only when the supply in machine hopper 20 is low enough to accept more material. Similarly, if switch 106 closes during a fill interval T3, timer 126 is reset to terminate the filling of the hopper loader.

Figure 4:
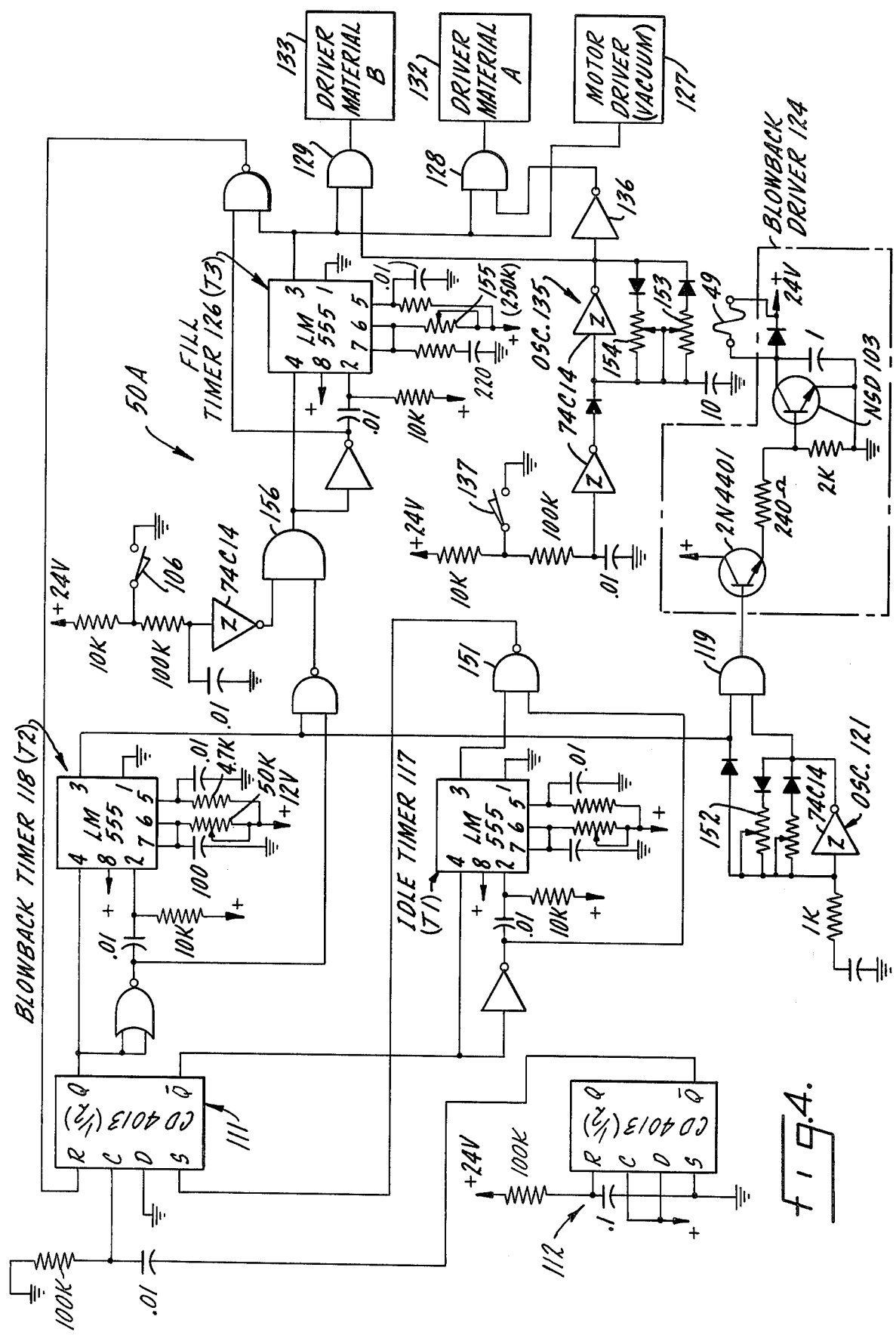
FIG. 4 is a schematic circuit diagram for one construction that may be employed in implementing the control circuit of FIG. 3.

FIG. 4 is a schematic circuit diagram for a control 50A representative of a preferred construction for control 50; circuit values and components are set forth in the drawing to the extent necessary to identify the more critical features of the circuit. Each of the timers 117, 118 and 126 is shown as a type LM 555 device of National Semiconductor Corporation with appropriate external circuitry. The oscillators 121 and 135 are Schmitt trigger oscillators incorporating NSD type 74C14 integrated circuit devices. Flip-flop 111 is shown as one-half of an NSD CD4013 CMOS device, the other half being used in the start-up circuit 112. Blowback driver circuit 124 is shown in full and would be duplicated in driver circuits 127,132 and 133. All diodes are type 1N4148; the positive supply is +12 volts except as indicated. Type 74C integrated circuits may be used for the various gates.

In operation, a high input signal to idle timer 117 (pin 4) causes its output to go high (pin 3). That output does not enable the NAND gate 151 in the timer output. When the LM555 device of timer 117 times out, however, both inputs to gate 151 are low, affording a high output to the set input S of flip-flop 111. Thus, gate 151 effectively affords the $\overline{Q}$ output for timer 117 in the construction shown in FIG. 4. Similar circuits are employed for the other timers 118 and 126.

In oscillator 121, FIG. 4, the potentiometer 152 provides for adjustment of the duration of the positive-going half cycles of the output signal to AND gate 119; the negative-going half cycles are of fixed duration. For oscillator 135, independent adjustment of the two half-cycles is afforded by the two potentiometers 153 and 154. The fill time interval T3 is adjusted by the potentiometer 155 in circuit 126; the other timers may be provided with similar adjustments if desired. An AND gate 156 is utilized to make the requisite connections from paddle sensing switch 106 and timer 118 to timer 126.

The operation of control 50A, FIG. 4, is essentially similar to control 50, FIG. 3, and hence need not be repeated. In either construction, as will be recognized, the sequence of blowback and fill operations, time intervals T2 and T3, can be reversed, though the preferred sequence is shown.

The invention has been described and illustrated as applied to a two-inlet loader hopper 10 which mixes and supplies just two materials to process apparatus 16 (FIGS. 1 and 2). However, it may be applied to other loader hoppers handling three or more materials; in some industrial applications as many as eight materials (or even more) may be mixed in and dispensed from the loader hopper. One appropriate modification in the control circuitry is generally illustrated in FIG. 6, constituting a modification of FIG. 3.

In the modification illustrated in FIG. 6, the fill enabling output signal from fill timer 126 (FIG. 3) is connected, through an inverter 201, to an enabling input of a shift register 202. In the illustrated circuit, it is assumed that the shift register 202 is a Type CD4022 with the vacuum or fill enabling input signal being supplied to the clock enable input of the shift register. Shift register 202 has eight decoded outputs customarily designated as decoded outputs zero through seven, and these designations are applied to the outputs in FIG. 6 instead of the pin designations for this specific form of shift register.

The first or zero output of shift register 202 is connected to one input of an AND gate 128. The second input to gate 128 is the fill enabling signal from fill timer 126. The output of gate 128 is connected to the solenoid driver circuit 132 that controls energization of the valve solenoid 93-0 for the first material to be fed into the hopper loader. The output of AND gate 128 is also connected to a timer 203 which may correspond in construction to the timers illustrated in FIG. 4. The output of timer 203 is connected to the clock input of shift register 202 through a sixteen-input OR gate 204. Timer 203 should incorporate means for adjusting the time interval for the timer to time out.

The output of gate 128 is also connected through a bypass switch 207 to an AND gate 205. Gate 205 receives a second input from a bypass oscillator 206, for which any suitable construction may be employed. The output of gate 205 is connected to one of the inputs of OR gate 204. Gates 128 and 205, solenoid driver 132, timer 203, and bypass switch 207 comprise a timer-driver logic circuit 210 that effectively determines the length of the time intervals during which solenoid 93-0 is energized to open the material inlet valve for the first material to be fed into the loader hopper. The circuit of FIG. 6 further includes additional timer driver logic circuits for each of the other materials to be supplied to the hopper. Thus, a second timer driver logic circuit 211, corresponding in construction to logic circuit 210, receives an input from the second or "one" output of shift register 202. Logic circuit 211 is also supplied with inputs from fill timer 126 and bypass oscillator 206. There are two outputs from logic circuit 211, a timer output and a bypass output, each of which is connected to an input of OR gate 204. Logic circuit 211 controls energization of the solenoid 93-1 that controls the inlet valve for the second material to be supplied to the hopper loader. The construction and connections for the other timer driver logic circuits 212 through 217 for solenoids 93-2 through 93-7; see also FIG. 7 are the same.

In the operation of the circuit of FIG. 6, at the beginning of the fill time interval T3 determined by timer 126, a fill enabling signal is supplied to shift register 202 and to each of the timer driver logic circuits 210–217. Assuming that shift register 202 is in a condition in which a high output is available at the zero output of the shift register (only one of the outputs will be high at any given time), AND gate 128 is enabled and energizes solenoid driver 132 which in turn energizes solenoid 93-0 to open the inlet valve for the first material to be supplied to the hopper. If bypass switch 207 is open, this condition is maintained during a predetermined time interval that is determined by the setting of timer 203. During this time, none of the other logic circuits 211–217 is similarly actuated because none of these circuits receives an actuating input from shift register 202.

When timer 203 times out, it supplies an actuating signal to OR gate 204 and this signal is in turn applied to the clock input of shift register 202, advancing the shift register by one count so that the zero output of the shift register goes low and the "one" output goes high. With the zero output of the shift register now low, there is no actuating signal supplied to gate 128 so that the solenoid driver circuit 132 and solenoid 93-0 are de-energized and the inlet valve for the first material closes. At the same time, the high output on the one terminal of shift register 202 affords an actuating signal to logic circuit 211. If the bypass switch in logic circuit 211 is open, the solenoid 93-1 that controls the inlet valve for the second material is energized and the second material is drawn into the hopper loader by the vacuum in the hopper loader as described above. After the timer in logic circuit 211 has timed out, an output signal is supplied to the clock input of shift register 202, through gate 204, and the shift register advances one more count. This interrupts the fill actuating signal supplied to logic circuit 211 and initiates a fill actuating signal to the next timer driver logic circuit 211 to open the next inlet valve and begin the introduction of the third material to the hopper loader. This sequence continues, with a fill actuating signal pulse being supplied to each timer driver logic to supply a short burst of each material to the hopper loader, the duration of each fill actuating signal being determined by the timer in each of the logic circuits 210–217. When the timer in logic circuit 217 times out, its output signal resets shift register 202 to the original condition and starts the sequence over again. Thus, shift register 202, in conjunction with the timers in the individual logic circuits 210–217, affords a fill signal generator that develops a repeating sequence of fill actuating signal pulses, one pulse for each of the fill control valves that are actuated by the solenoids 93-0 through 93-7. The relative durations of the fill actuating signal pulses are determined by the settings of the individual timers such as the timer 203. Accordingly, the control valves are opened in a repeating sequence throughout the time interval T3 during which the fill enabling signal from timer 126 maintains the vacuum in the upper portion of the hopper loader.

In a given instance, it may be desirable to omit the feeding of one or more of the available materials into the hopper loader. Thus, for example, when it is desired to eliminate the first material from those being supplied to the hopper loader, bypass switch 207 in logic circuit 210 is closed. This supplies an enabling signal to gate 205, which then applies the next signal pulse from bypass oscillator 206 to the clock input of shift register 202 through OR gate 204. This advances the count in shift register 202 by one count almost instantaneously after AND gate 128 has been opened, completely bypassing timer 203, so that solenoid 93-0 is not energized for a period sufficient to open the first material fill control valve. In the same manner, the bypass switches in any of the other logic circuits 211–217 can be closed to eliminate the materials controlled by those logic circuits from the input to the hopper loader.

From the foregoing description, it will be apparent that the shift register 202 and the logic circuit timers such as the timer 203 perform the same basic purpose as oscillator 135 in the embodiment of FIG. 3. Thus, each embodiment of the invention includes a fill signal generator, in one instance the oscillator 135 and in the other instance the shift register 202 and associated timer circuits, that develops a repeating sequence of fill actuating signal pulses, one pulse in each sequence for each of the fill control valves for the hopper loader. Furthermore, the fill signal generator in each instance includes means for adjusting the relative durations of the fill actuating signal pulses. For the embodiment of FIG. 3, this adjustment is accomplished by varying the duty cycle of oscillator 135. For the modification of FIG. 6, the adjustment is made by adjusting the time intervals for the timers such as timer 203. In FIG. 6, for the extreme instance of a material that is to be omitted entirely, the time interval is effectively reduced to zero by closing of the bypass switch in the related logic circuit, such as switch 207.

The one specific circuit described above, FIG. 4, is based upon a particular group of integrated circuits. However, it will be recognized that the logic for the control circuit of the present invention could equally well be implemented in TTL logic circuitry or in other forms, including a micro-processor. Moreover, only one basic mechanical arrangement for hopper loader 10 (FIG. 1) has been illustrated with a minor modification for additional ports being shown in FIG. 7. However, the control circuit is not limited to use with a hopper loader that incorporates a blower such as the blower 41 as a direct and integral part of the loader mechanism. Rather, the control may equally well be applied to a separate apparatus capable of supplying air under pressure and also evacuating the loader. An excellent example of a separate air power unit of this kind is described in Evans U.S. Pat. No. 3,836,288.

In the foregoing description, the source of the blowback actuating signal that supplies actuating pulses to the blowback driver circuit 124 (FIGS. 3 and 4) is shown as the oscillator 121. However, several types of circuit may be utilized for this purpose, so long as some means is provided for developing a blowback actuating signal that comprises a series of pulses, with some means for adjusting the period of the pulses and preferably the interval between pulses.

FIG. 7 affords a simplified illustration of a vacuum hopper loader having eight inlet ports 31-0 through 31-7, representing one of the many forms of hopper which may be controlled by the circuit modification of FIG. 6. The inner end of the connector 33-0 of port 31-0 is normally closed by a valve closure member 69-0 held in place by a spring-biased pneumatic cylinder 53-0 mounted on a support bracket 54-0. The port 91-0 of cylinder 53-0 is connected to a three-way valve 95-0 actuated by solenoid 93-0. Inlet port 31-1 is of corresponding construction, comprising an inlet connector 33-1 normally closed by a closure member 69-1 which can be moved to open position by a pneumatic cylinder 53-1 having a port 91-1 connected to a three-way valve 95-1 actuated by solenoid 93-1. This construction is duplicated for each of the remaining hopper inlet ports 31-2 through 31-7, port 31-7 being shown to include a connector 33-7, closure member 69-7, pneumatic cylinder 53-7, cylinder port 91-7, three-way valve 95-7, and actuating solenoid 93-7. Mechanical operation is as described for FIG. 1, with each inlet port 31-0 through 31-7 connected to a different material supply.

I claim:

1. A control circuit for a vacuum hopper loader of the kind comprising a hopper having an air port at the top of the hopper, a filter extending across the air port, a plurality of material inlet ports located below the filter, individual electrically actuated material fill control valves for opening and closing the material inlet ports, and air supply means for supplying air under pressure to the air port, and evacuation means connected to the air port, comprising:

blowback timer means for developing a blowback enabling signal for a predetermined time interval T2;

blowback signal generator means for developing a blowback actuating signal comprising a series of pulses, including means for adjusting the period of such pulses;

blowback gate means, connected to the blowback timer means and blowback signal generator means and to the air supply means, for actuating the air supply means to apply a series of pulses of air through the filter into the hopper during the time interval T2;

fill timer means for developing a fill enabling signal for a predetermined time interval T3;

fill signal generator means for developing a repeating sequence of fill actuating signal pulses, one pulse for each fill control valve, including means for adjusting the relative durations of the fill actuating signal pulses;

fill vacuum coupling means for actuating the evacuation means to evacuate the hopper continuously during time interval T3;

fill logic means connected to the fill timer means, the fill signal generator means, and the fill control valves to open the control valves in repeating sequence during time interval T3;

and control sequence coupling means interconnecting an input of one of the timer means to an output of the other timer means to set the one timer means in response to timing out of the other.

2. A vacuum hopper loader control circuit according to claim 1, for use with a hopper loader having two inlet ports, in which the fill signal generator means comprises an oscillator incorporating means for adjusting the duration of one half cycle of the oscillator output signal.

3. A vacuum hopper loader control circuit according to claim 2, in which the fill oscillator includes independent means to adjust the period for each half-cycle of the fill actuating signal.

4. A vacuum hopper loader control circuit according to claim 2, further comprising:

inlet sensing means, connected to the fill oscillator, for sensing an excessive input material condition at one inlet to the hopper and effectively disabling the fill oscillator means to eliminate one half cycle of the fill actuating signal while such excessive input material condition persists.

5. A vacuum hopper loader control circuit according to claim 1, for use with a hopper loader having more than two inlet ports, in which the fill signal generator means comprises:

a shift register having at least as many stages as the number of hopper loader inlet ports and constituting the source of the fill actuating signal pulses;

and a plurality of timers individually associated with the inlet ports, one timer for each inlet port, each timer being energized upon opening of its associated inlet port, and each timer being coupled back to the shift register to advance the count in the shift register when the timer has been energized for a preset interval.

6. A vacuum hopper loader control circuit according to claim 5 and further comprising a selectively actuatable bypass circuit for at least one timer, bypassing the timer to reduce the effective duration of the fill actuating signal pulse for one material to zero.

7. A vacuum hopper loader control circuit according to claim 5 in which each timer includes adjusting means for adjusting the timing interval of the timer to thereby adjust the duration of one of the fill actuating signal pulses.

8. A vacuum hopper loader control circuit according to claim 1, further comprising:

inlet sensing means for sensing an excessive input material condition at one inlet to the hopper;

and means for effectively disabling the fill signal generator means and supplying a continuous fill actuating signal to the fill logic means to open only the fill control valve for that one inlet which such excessive condition persists.

9. A vacuum hopper loader control circuit according to claim 1, further comprising:

output sensing means, connected to the fill timer means, for sensing an excessive output material conditions at the output of the hopper loader and precluding development of the fill enabling signal whenever an excessive output material is sensed.

10. A vacuum hopper loader control according to claim 9, in which the output sensing means comprises a sensing switch connected to a reset input for the fill timer means.

11. A vaccuum hopper loader control circuit according to claim 1, further comprising:
idle timer means determining an idle time interval T1, at the end of which the idle timer means develops an idle interval termination signal;
the control sequence coupling means interconnecting the three timer means so that successive cycles of operation occur in the sequence T1,T2,T3; T1, T2,T3; etc.

* * * * *